United States Patent [19]
Scott

[11] 3,939,881
[45] Feb. 24, 1976

[54] APPARATUS FOR CONTROLLING DUST EMISSIONS

[76] Inventor: William H. Scott, 14326 SE. 162 Place, Renton, Wash. 98055

[22] Filed: May 28, 1974

[21] Appl. No.: 474,039

[52] U.S. Cl. .................... 141/91; 55/227; 55/228; 55/385 R; 55/DIG. 41; 239/550; 261/115
[51] Int. Cl.² ............................................. B65B 1/28
[58] Field of Search ......... 55/220, 227, 228, 83, 84, 55/DIG. 41, 385; 141/63, 70, 98, 91, 93; 261/18 B, 115, 117, 118; 302/59; 134/199; 239/163, 287, 550, 177, 212; 98/114, 115 R; 202/227, 228, 263; 110/127, 128, 171; 137/99; 169/15

[56] References Cited
UNITED STATES PATENTS

| | | | |
|---|---|---|---|
| 843,180 | 2/1907 | Rogers | 261/115 |
| 1,006,210 | 10/1911 | Heid | 110/171 |
| 1,717,412 | 6/1929 | Rowe | 55/227 |
| 1,778,364 | 10/1930 | Lewis | 261/116 |
| 1,818,143 | 8/1931 | Lyons | 110/119 X |
| 2,403,545 | 7/1946 | Nutting | 55/227 |
| 2,998,934 | 9/1961 | Broughton | 239/550 |
| 3,200,570 | 8/1965 | Dattilzo et al. | 261/115 |
| 3,352,779 | 11/1967 | Austin et al. | 137/99 X |
| 3,843,461 | 10/1974 | Allen | 55/385 X |

FOREIGN PATENTS OR APPLICATIONS

| 897,136 | 10/1936 | Australia | 55/84 |
|---|---|---|---|

*Primary Examiner*—Bernard Nozick
*Assistant Examiner*—David L. Lacey
*Attorney, Agent, or Firm*—Kolisch, Hartwell, Dickinson & Stuart

[57] ABSTRACT

Apparatus for precipitating dust from a region surrounding an area from which dust emanates. The apparatus includes a fluid supply conduit for carrying water under pressure to the region adjacent the dust, area, a proportioning pump for injecting a preselected quantity of a surfactant into the water, and nozzles on the conduit adjacent the dust emanating region. The mixture of water and surfactant is atomized and sprayed from the nozzles in a curtain of finely dispersed spray, or fog, adjacent the dust region. The substantially continuous curtain of finely dispersed spray surrounding the dust region acts to precipitate dust particles from the air. The mixture of a surfactant with the water allows the water to easily wet the dust particles, whereby smaller quantities of water may be used with improved dust precipitation occurring.

3 Claims, 9 Drawing Figures

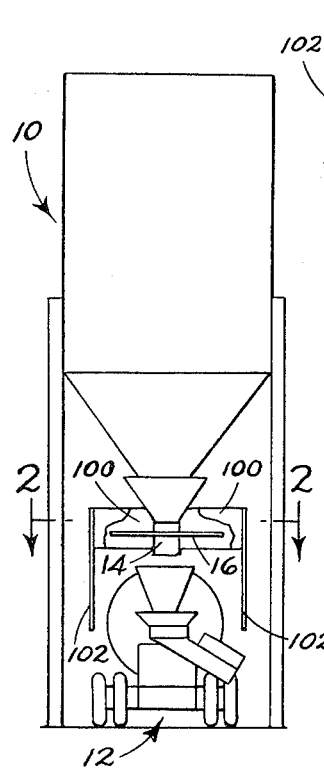
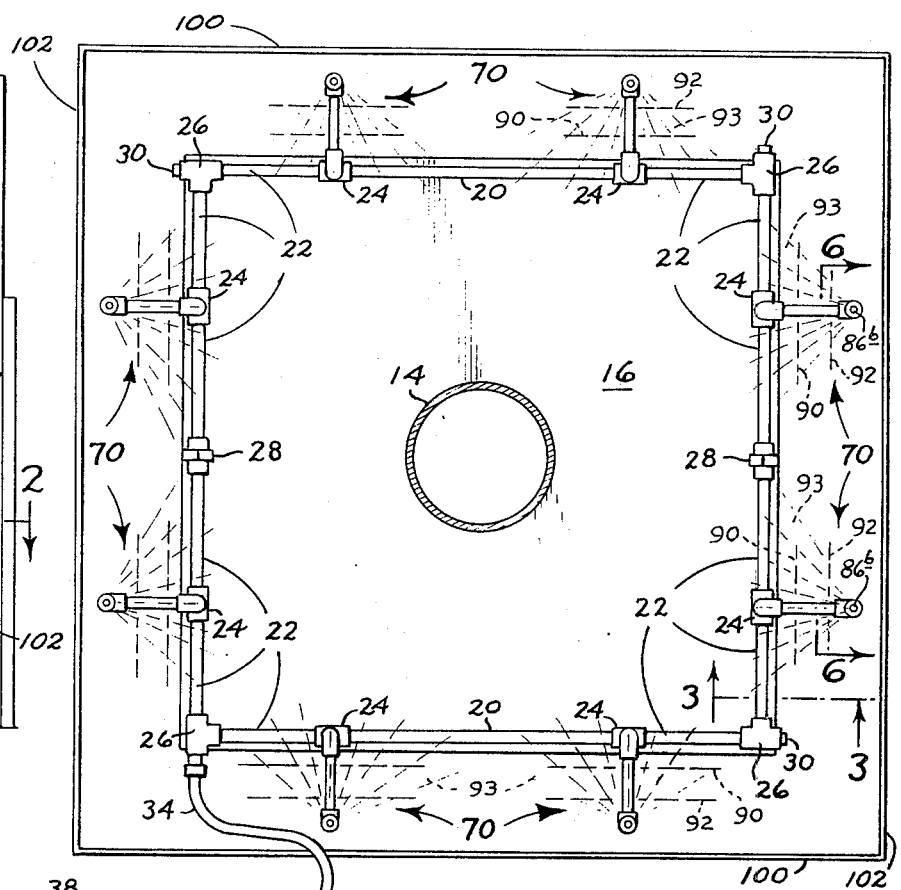
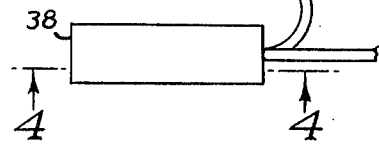
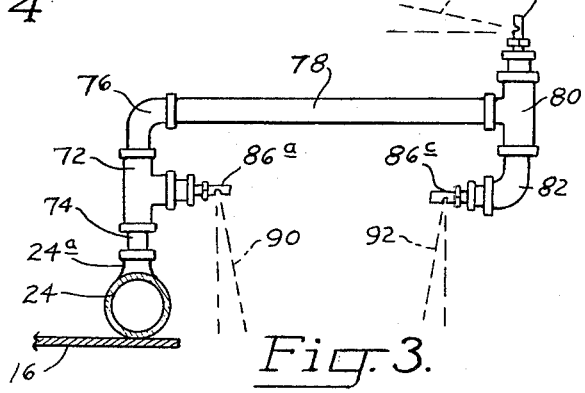
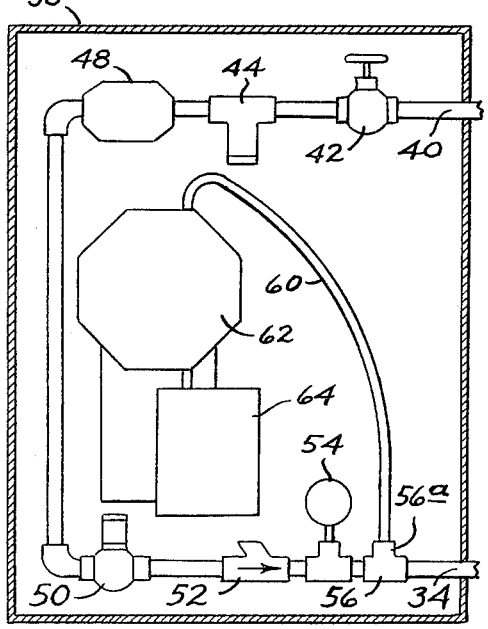
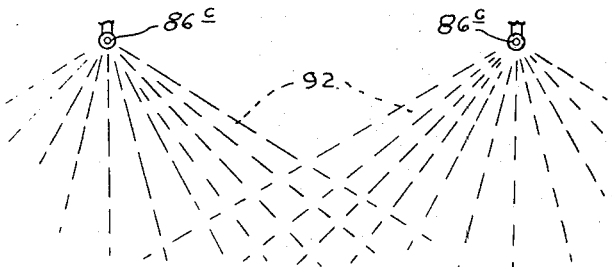
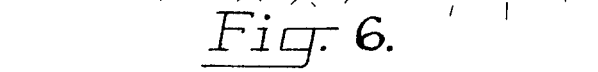

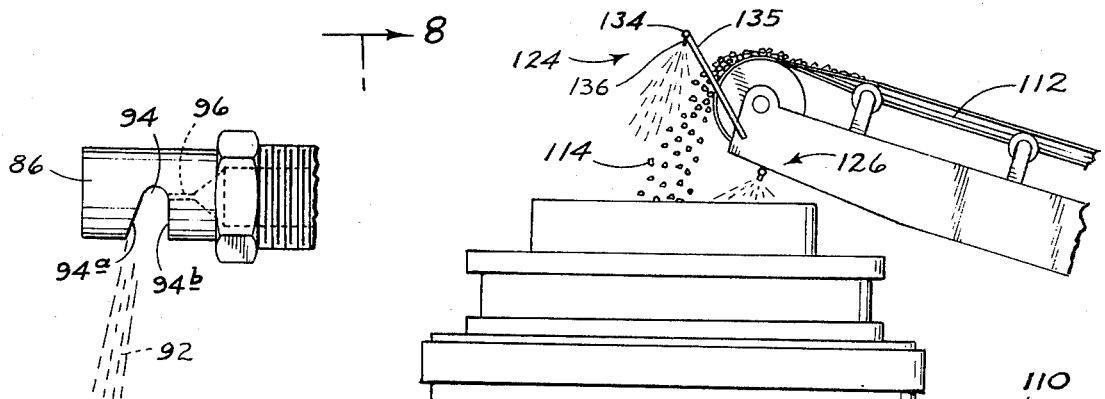
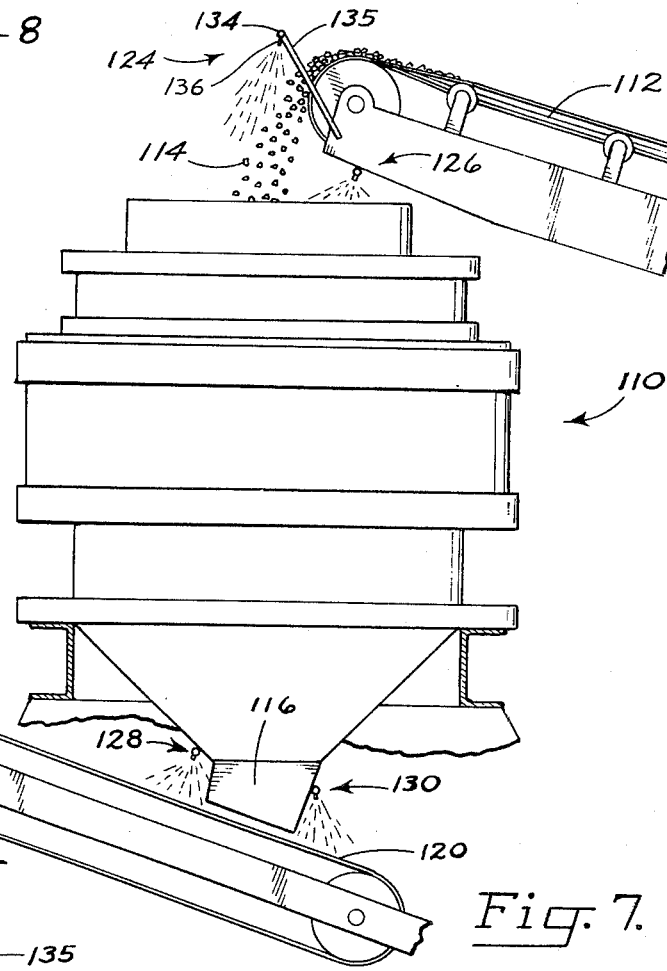
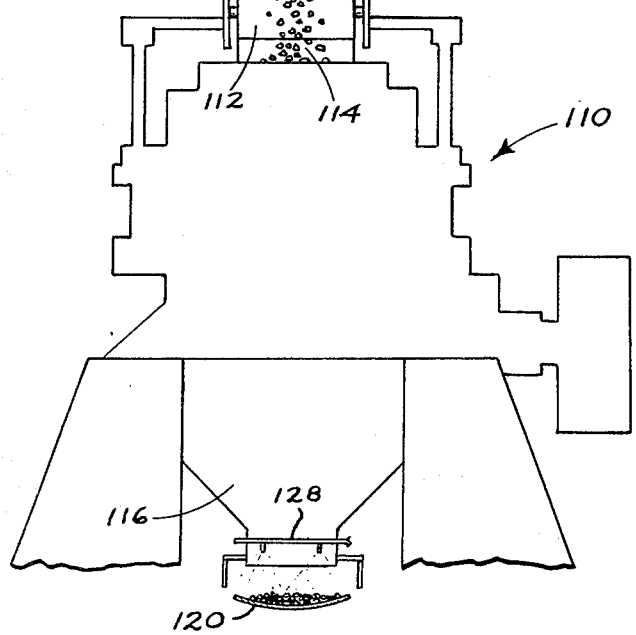
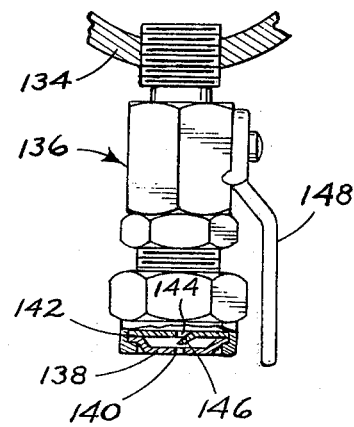

APPARATUS FOR CONTROLLING DUST EMISSIONS

BACKGROUND AND SUMMARY OF THE INVENTION

This invention relates to apparatus and a method, for precipitating dust from the air in a region surrounding the area from which dust emanates.

In recent years, and particularly because of governmental air pollution regulations various manufacturers, processors, etc., have been forced to take action to reduce the amount of dust which escapes from their activity. Two examples of activities which present large dust emission problems are the manufacture, or batching, of concrete and rock crushing operations.

Various methods attempting to control dust emissions have been attempted in the past. Such prior methods have either been very expensive or for other reasons have met with little success. Included in such prior attempts are bag houses and water scrubbers using large suction fans, and systems in which large quantities of water are sprayed directly onto the material from which dust would emanate, thus producing a substantial wetting of the base material. Examples of the prior water spray systems include systems where a large quantity of water is sprayed directly onto material on a conveyor belt to prevent dust from emanating therefrom and a system where large quantities of water are sprayed directly onto the material being batched to manufacture concrete. Not only does such a system provide massive amounts of water which must be carried away in some manner, but also produces a significant and undesirable change in the proportion of moisture in either the crushed material or the batched material.

A general object of the invention is to produce novel apparatus for effectively controlling dust emissions, which apparatus is inexpensive to construct and operate.

Another object of the present invention is to provide novel apparatus which is operable to produce a very finely dispersed, fog-like spray of fluid in a region surrounding the area from which dust emanates, thus to precipitate dust particles from the air, without adding significantly to the moisture in the base material from which the dust emanates.

Yet another object is to provide such apparatus in which a surfactant is added to the working fluid in a proportioned ratio, whereby smaller quantities of water may be used with improved dust precipitation occurring.

A further object of the invention is to provide such apparatus in which concentrated surfactant is injected in small quantities into water flowing toward spray nozzles, thus precluding the need for mixing large quantities of surfactant and water prior to use.

A still further object is to provide novel apparatus for precipitating dust from a region surrounding a dust originating area, in which a double curtain of finely dispersed, fog-like spray is provided surrounding the region thus assuring that dust will be captured and precipitated out of the region.

DRAWINGS

These and other objects and advantages will become more fully apparent as the following description is read in conjunction with the drawings, wherein:

FIG. 1 is an elevation view of a concrete batch plant with apparatus according to the invention for controlling dust;

FIG. 2 is an enlarged top plan view of dust controlling apparatus taken generally along the line 2—2 in FIG. 1;

FIG. 3 is an enlarged view of a set of nozzles in the apparatus taken generally along the line 3—3 in FIG. 2;

FIG. 4 is an enlarged view taken generally along the line 4—4 in FIG. 2, illustrating fluid and surfactant supply means in the system;

FIG. 5 is an enlarged view of a spray nozzle in the system;

FIG. 6 is a view taken generally along the line 6—6 in FIG. 2 illustrating the spray pattern of a pair of laterally spaced nozzles in the system;

FIG. 7 is a schematic side elevation view illustrating apparatus according to the invention used in conjunction with a rock crushing plant;

FIG. 8 is a front elevational view of the rock crusher taken generally along the line 8—8 in FIG. 7; and FIG. 9 is an enlarged view of a form of spray nozzle which may be used in the system illustrated in FIGS. 7 and 8.

DETAIL DESCRIPTION OF PREFERRED EMBODIMENTS OF THE INVENTION

Referring to the drawings, and first more particularly to FIG. 1, at 10 is indicated generally a concrete batch plant, also referred to herein as material handling means, under which a concrete mixing truck 12 is parked. A chute 14 on the batch plant is positioned to discharge material from the batch plant into the truck.

Referring to FIGS. 1 and 2, a horizontally disposed, substantially square plate 16 is suspended on the batch plant and has a hole cut therethrough through which chute 14 extends. The materials discharged from chute 14 may be dry cement, crushed aggregate, etc., from which dust emanates as it is dumped into the truck. The area at the bottom of chute 14 thus may be considered a dust originating area.

Referring to FIG. 2, a plurality of elongate pipe sections 20, 22 are interconnected by pipe tees 24, 26 and unions 28 to define a rectangular piping frame, or system, having generally the dimensions of plate 16. Tees 26 form corners for the rectangular pipe frame. Tees 24 have upwardly projecting reducing legs 24a as seen in FIG. 3. The pipe frame is secured to the top of plate 16 adjacent the outer margins of the plate.

Pipe plugs 30 close off one leg of each of three of tees 26. One leg of the fourth tee 26 has one end of an elongate, flexible, conduit 34 connected thereto. Referring to FIG. 4, the opposite end of flexible conduit 34 is connected, through various devices in an enclosing box 38, to a water feed line 40. Water line 40 may be connected to a conventional water supply, such as a city water main.

Referring still to FIG. 4, and proceeding from line 40 toward line 34 in the fluid supply system, first is a gate valve 42 permitting manual opening or closing of the line. Following gate valve 42 is a strainer 44 operable to remove particulate matter from water flowing into the system through line 40. In the embodiment illustrated, strainer 44 includes a straining screen of 100 mesh size (100 mesh to the inch).

Following strainer 44 is a pressure regulating valve 48 which is operable to maintain the pressure at its outlet side at a preselected pressure. Following pressure regulating valve 48 in the line is an electrically operated, solenoid controlled valve 50.

Following solenoid controlled valve 50 is a check valve 52 permitting fluid flow therethrough only in the direction from line 40 toward line 34. A pressure gauge 54 follows check valve 52 in the line, and the pressure gauge is followed by a reducing tee 56. The reducing leg 56a of tee 56 is connected, through an elongate, flexible conduit 60 to the discharge side of an electrically operated proportioning pump 62. The inlet side of pump 62 is connected to a reservoir 64 of a desired surfactant material. The proportioning pump is operable to draw a desired quantity of surfactant from reservoir 64 and inject it into the fluid flowing in the fluid supply lines at a preselected proportioned rate.

Solenoid controlled valve 50 and pump 62 are operatively connected, through conventional switching means, to the batch plant controls, whereby when the batch plant is operating to discharge materials which may produce dust, valve 50 is opened to permit a flow of fluid under pressure therethrough and pump 62 is operated to inject a desired quantity of surfactant into the water flowing toward conduit 34. When the batch plant is not operating, valve 50 is closed and pump 62 is not operating.

A surfactant which has been found to work well in this system is Tritron n–128 sold by Rohm and Haas Co. mixed with water in reservoir 64 in a solution containing 30% Triton N–128 and 70% water. Using such surfactant, it has been found that it works well, when injected by the proportioning pump at a rate of about 1 part surfactant to 200 parts water flowing in the system. Another surfactant which works well in this system is Ecowet produced and sold by West Mount Corp. of Portland, Oreg. The Ecowet material works well when injected by pump 62 at rates as low as 1 part Ecowet per 2,000 parts water flowing in the system.

The fluid supply system just described, thus is operable to provide a mixture of water and proportioned quantity of surfactant through conduit 34 to the previously described pipe frame secured to plate 16.

Referring to FIGS. 2 and 3, operatively connected to the reducing leg 24a of each of tees 24 is a spray nozzle tree indicated generally at 70. Each nozzle tree is constructed generally as illustrated in FIG. 3. A pipe tee 72 is connected to reducing leg 24a of tee 24 through a pipe nipple 74. An elbow 72 supports an elongate, substantially horizontal pipe 78 on tee 72. Another tee 80 is connected to the outer end of pipe 78, and an elbow 82 pointing inwardly toward tee 72 is connected to the lower leg of tee 80. Spray nozzles 86a, 86b, 86c are connected to the central leg of tee 72, the upwardly projecting leg of tee 80 and the inwardly facing end of elbow 82, respectively. Nozzles 86a, 86c are positioned to direct a spray of fluid downwardly, as illustrated by the dashed spray patterns at 90, 92, respectively, and nozzle 86b is positioned to direct a spray of fluid inwardly over the top of plate 16 as indicated by the dashed spray pattern at 93.

Referring to FIG. 5, where a nozzle 86 is illustrated in greater detail, it will be seen that a nozzle in the system includes a notch 94 having opposed, angularly disposed sides 94a, 94b. A small diameter orifice 96 opens into notch 94 adjacent the inner end of the notch. The orifice may range in size from 0.016 inch to 0.150 inch depending on the fluid pressure used in the system. It has been found that a nozzle having a 0.033 inch diameter orifice works well when supplied with fluid in a pressure range between 30 and 60 psi. At 30 psi fluid is dispensed from a nozzle at the rate of about 0.17 gallons per minute and at 60 psi the rate is about 0.24 gallons per minute. Fluid under pressure supplied to the nozzle is directed outwardly from the orifice against side 94a which atomizes the fluid. A finely dispersed fog-like spray of fluid then is emitted therefrom in a fan-shaped spray pattern as illustrated in FIGS. 5 and 6. Due to the substantially fan-shaped pattern of spray emanating from the nozzles, and referring to FIG. 6, laterally spaced nozzles along a peripheral side of the region from which dust emanates produce spray patterns, wherein the sprays from the nozzles intermix in a region between adjacent nozzles. This produces a substantially continuous spray curtain about the dust producing region.

Referring to FIG. 3, the set of spray nozzles 86a connected to tees 72 in the various spray trees 70 provide a first curtain of finely dispersed, fog-like, spray extending downwardly past the outer edge of plate 16. Spray nozzles 86c connected to elbows 82 produce a second curtain of spray speced spaced outwardly from the spray curtain from nozzles 86a. Thus, a double curtain of finely dispersed spray is provided about the dust producing area to capture and precipitate dust. The spray from nozzles 86b on the upper legs of tees 80, projecting substantially horizontally over the tops of the other spray curtains and over the top of plate 16 captures dust which otherwise might rise upwardly over the top of the plate.

Referring to FIGS. 1 and 2, elongate, substantially rectangular sheets of material 100, 102 are suspended in regions spaced radially outwardly from plate 16 to form a windscreen to prevent air currents from disturbing the spray from nozzles 86.

Describing the operation of the apparatus thus far described, as operation of the batch plant is initiated to dump material into truck 12, solenoid controlled valve 50 is opened permitting water from line 40 to pass into conduit 34 and into the pipe frame feeding nozzles 86. Pump 62 also is started. As water flows from line 40 toward conduit 34 surfactant material is drawn from reservoir 64 by pump 62 and injected in a preselected, proportioned rate into the water flowing into conduit 34. This water-surfactant mixture is sprayed from nozzles 86 downwardly in a double spray curtain pattern peripherally about the discharge chute and substantially horizontally over the top of the plate through which the chute extends.

The nozzles are so constructed that when fluid is discharged therefrom at a preselected pressure it is atomized and a very finely dispersed fog-like spray in a fan-shaped pattern emanates from the nozzles. The curtains of finely dispersed spray captures dust particles which may fly from the chute and precipitate them from the atmosphere. The surfactant acts as a wetting solution to aid in wetting of the dust particles, and causes the dust particles to be attracted to each other to unite and, due to the increase in mass, precipitate more rapidly from the air.

Referring to FIGS. 7 and 8, a rock crusher 110 is illustrated schematically. An elongate, inclined conveyor belt 112 is operable to carry rock to a position above the top of crusher 110 and drop such rock, as indicated by stream of material 114, into the top of the crusher. Aggregate, after crushing, is discharged through a chute 116 at the bottom of crusher 110 onto the top of a conveyor belt 120.

In such operation, small particles of aggregate, also referred to as fines, are released from the aggregate mass and fly into the surrounding atmosphere as dust, both at the region where material is dumped into the top of the crusher and where material is discharged onto conveyor 120.

To control the dust emanating from the material dumped into the crusher and discharged from the crusher a plurality of spray devices, as illustrated generally at 124, 126, are mounted above and below the discharge end of conveyor 112, respectively, and spray devices 128, 130 are mounted on opposite sides of the discharge end of chute 116 over conveyor 120. Devices 124, 126, 128, 130 are substantially similar in construction, and thus only one will be described in detail.

Referring to device 124, it includes an elongate, substantially horizontal pipe 134 supported adjacent its opposite set of ends by a pair of support posts 135. A plurality of spray nozzles, such as that illustrated in detail in FIG. 9 at 136, are mounted at spaced positions along pipe 134. Nozzles 136 are of a type operable to atomize fluid and discharge the same therefrom to radiate a finely dispersed fog-like spray of fluid in a 360°, circular, pattern.

As is seen in FIG. 9, where a nozzle 136 is illustrated in greater detail, it includes a disc 138 at the discharge end thereof with a small orifice 140 extending therethrough. Orifice 140 may be on the order of 0.094 inch in diameter. Spaced above disc 138 is another disc 142. Small openings, such as that indicated at 144, extend through disc 142 on opposite sides of the center of the disc. Deflectors, as indicated at 146, are secured below openings 144 to swirl fluid in a circular pattern between discs 138, 142 before it exits from orifice 140.

A valve actuated by lever arm 148 is built into the nozzle assembly for controlling flow through individual nozzles in the system. Nozzles 136 are spaced at sufficiently close intervals along pipe 134 so that the spray from adjacent nozzles overlap, to intermix in a substantially continuous, finely dispersed spray, or fog, of fluid along one side of the region from which dust emanates.

Fluid supply means, as illustrated in FIG. 4 and previously described, may be connected to each of spray devices 124, 126, 128, 130 to provide a mixture of water and surfactant thereto under pressure.

In operation, material 114 discharged into the crusher and crushed aggregate discharged from chute 116 onto conveyor 120 produce dust. The spray from devices 124, 126, 128, 130 wet dust particles, and precipitate them out of the atmosphere to reduce pollution. Another advantage of a system as illustrated with the rock crusher is that a portion of the dust precipitated may fall back into the mass to be crushed, or into the crushed mass of aggregate. In this way, the natural fines may be returned to the base material, which fines may be important when the resulting mass is used in the manufacture of asphalt or concrete. Since the finely dispersed sprays of water and surfactant mixture may be supplied in such small quantities to produce the desired precipitation of the dust, only minimal amounts of moisture are added to the base material should it precipitate back into the base quantity. Such minimal quantities of moisture have substantially no effect on screening of the aggregate for gradation and resultant use of the aggregate in concrete or asphalt.

Although the invention has been described in relation to precipitating dust produced by a concrete batch plant and in a rock crushing operation, it should be realized that it is adapted for use in almost any activity in which dust becomes a problem.

While preferred embodiments of the invention has been described herein, it should be apparent to those skilled in the art that variations and modifications are possible without departing from the spirit of the invention.

It is claimed and desired to secure by Letters Patent:

1. In combination with material handling means, which during operation, produces dust which drifts into a region adjacent said material handling means, dust control apparatus for precipitating dust from the air in said region comprising a first set of nozzles comprising a first nozzle spaced radially outwardly from said material handling means and a second nozzle spaced a distance radially outwardly from said first nozzle, a second set of first and second radially spaced nozzles, spaced laterally from said first-mentioned set, fluid supply means connected to said nozzles operable to supply a flow of fluid under pressure to said nozzles, and injecting means for injecting a preselected quantity of surfactant into such flow of fluid to produce a mixture having preselected proportions of fluid and surfactant, each of said nozzles being operable to atomize said mixture and dispense it in a curtain of finely dispersed spray, said nozzles being so disposed that the sprays from said first and second nozzles in each set are directed in substantially the same direction to produce a double curtain of spray in said region, and said second set is positioned sufficiently closely to said first set to produce intermixing of the spray dispensed from said first and second sets of nozzles in a region therebetween to provide a substantially continuous spray curtain.

2. The combination of claim 1, which further comprises a third set of nozzles spaced above said area in which dust originates in said material handling means and directed inwardly over the top of said area.

3. In combination with material handling means, which, during operation, produces dust which drifts into a region adjacent said material handling means, dust control apparatus for precipitating dust from the air in said region comprising a first set of nozzles comprising a first nozzle spaced radially outwardly from said material handling means and a second nozzle spaced a distance radially outwardly from said first nozzle, a second set of first and second radially spaced nozzles, spaced laterally from said first-mentioned set, and fluid supply means connected to said nozzles operable to supply a flow of fluid under pressure to said nozzles, each of said nozzles being operable to atomize said mixture and dispense it in a curtain of finely dispersed spray, said nozzles being so disposed that the sprays from said first and second nozzles in each set are directed in substantially the same direction to produce a double curtain of spray in said region, and said second set is positioned sufficiently closely to said first set to produce intermixing of the spray dispensed from said first and second sets of nozzles in a region therebetween to provide a substantially continuous spray curtain.

* * * * *